(12) United States Patent
Shintani

(10) Patent No.: US 10,788,974 B2
(45) Date of Patent: Sep. 29, 2020

(54) INFORMATION PROCESSING APPARATUS

(71) Applicant: KYOCERA Document Solutions Inc., Osaka (JP)

(72) Inventor: Kazushi Shintani, Osaka (JP)

(73) Assignee: KYOCERA Document Solutions Inc., Tamatsukuri, Chuo-ku, Osaka (JP)

( * ) Notice: Subject to any disclaimer, the term of this patent is extended or adjusted under 35 U.S.C. 154(b) by 0 days.

(21) Appl. No.: 16/296,944

(22) Filed: Mar. 8, 2019

(65) Prior Publication Data

US 2019/0286293 A1 Sep. 19, 2019

(30) Foreign Application Priority Data

Mar. 19, 2018 (JP) ................................. 2018-051718

(51) Int. Cl.
*G06F 3/048* (2013.01)
*G06F 3/0485* (2013.01)
*G06F 3/0481* (2013.01)
*G06F 1/16* (2006.01)
*G06F 3/01* (2006.01)

(52) U.S. Cl.
CPC .......... *G06F 3/0485* (2013.01); *G06F 1/1694* (2013.01); *G06F 3/0481* (2013.01)

(58) Field of Classification Search
CPC .... G06F 3/0485; G06F 3/0481; G06F 1/1694; G11B 19/025
See application file for complete search history.

(56) References Cited

U.S. PATENT DOCUMENTS

| 5,884,056 | A | * | 3/1999 | Steele | H04N 7/17318 715/738 |
| 7,173,637 | B1 | * | 2/2007 | Hinckley | G06F 3/0362 345/684 |
| 9,318,070 | B2 | * | 4/2016 | Park | G09G 5/00 |
| 9,952,663 | B2 | * | 4/2018 | Kempinski | G06F 3/012 |
| 2006/0120624 | A1 | * | 6/2006 | Jojic | G06F 16/745 382/284 |
| 2007/0071413 | A1 | * | 3/2007 | Takahashi | G11B 27/005 386/230 |

(Continued)

FOREIGN PATENT DOCUMENTS

JP 2005165760 A * 12/2003 ............. G06F 3/048
JP 2005-165760 A 6/2005

*Primary Examiner* — Nicholas Augustine
(74) *Attorney, Agent, or Firm* — IP Business Solutions, LLC

(57) ABSTRACT

An information processing apparatus includes a display unit, a storage unit, and a control unit. The control unit reads out a content from the storage unit containing a plurality of contents to be sequentially displayed on a screen of the display unit, and displays the content on the screen. When the screen is tilted and a tilt direction is detected, the control unit displays the content such that the content gradually disappears by moving from a higher side to a lower side along the tilt direction, reads out a content to be displayed next from the storage unit, and displays the next content such that the next content gradually appears by moving from the higher side to the lower side along the tilt direction, over a vacant region in the screen where the preceding content is no longer displayed, and expanding as the preceding content disappears.

7 Claims, 25 Drawing Sheets

(56) References Cited

U.S. PATENT DOCUMENTS

| | | | |
|---|---|---|---|
| 2011/0296351 A1* | 12/2011 | Ewing, Jr. | G06F 3/0483 |
| | | | 715/841 |
| 2014/0078318 A1* | 3/2014 | Alameh | G06F 3/017 |
| | | | 348/207.99 |
| 2014/0198038 A1* | 7/2014 | Yagihashi | H04M 1/72563 |
| | | | 345/156 |
| 2017/0357318 A1* | 12/2017 | Chaudhri | G06F 3/0482 |
| 2019/0095068 A1* | 3/2019 | Suzuki | G06F 3/04817 |

\* cited by examiner

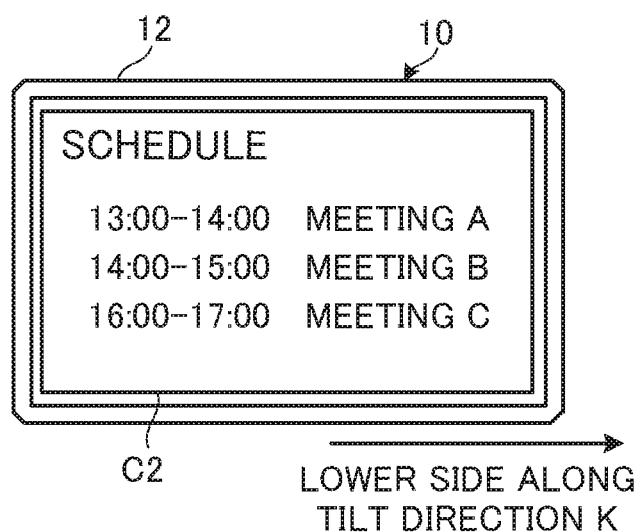

INFORMATION PROCESSING APPARATUS

INCORPORATION BY REFERENCE

This application claims priority to Japanese Patent Application No. 2018-051718 filed on Mar. 19, 2018, the entire contents of which are incorporated by reference herein.

BACKGROUND

The present disclosure relates to a portable information processing apparatus with a display unit, and more particularly to a technique to switch display contents on the display unit.

Techniques thus far developed to switch a display content on a display device include utilizing a tilt sensor in a mobile phone terminal, to switch the display content on the display unit according to the extent of the tilt. For example, when a tilt angle detected by the tilt sensor exceeds a predetermined level, the content of the next page or the preceding page is displayed, depending on the tilt direction, and also the content of a page a specified number of pages ahead, or the content of a page a specified number of pages behind, can be displayed depending on the tilt direction.

SUMMARY

The disclosure proposes further improvement of the foregoing technique. In an aspect, the disclosure provides an information processing apparatus including a display unit, a storage unit, and a control unit. The storage unit stores a plurality of contents to be sequentially displayed on a screen of the display unit. The control unit includes a processor, and acts as a tilt detector and a controller, when the processor executes a control program. The tilt detector detects a tilt direction of the screen, when the screen is tilted. The controller reads out the content from the storage unit and causes the display unit to display the content on the screen. When the tilt detector detects the tilt direction of the screen, the controller (i) causes the display unit to display the content on the screen, such that the content gradually disappears by moving from a higher side to a lower side along the tilt direction detected, and (ii) reads out a content next in a display order from the storage unit, and causes the display unit to display the next content that has been read out, such that the next content gradually appears by moving from the higher side to the lower side along the tilt direction, over a vacant region in the screen where the preceding content is no longer displayed, and expanding as the preceding content disappears.

BRIEF DESCRIPTION OF THE DRAWINGS

FIG. 8A and FIG. 8B are schematic drawings showing a display switching method of the content, on the screen of the display unit.

DETAILED DESCRIPTION

Hereafter, an embodiment of the disclosure will be described, with reference to the drawings.

Figure 1:
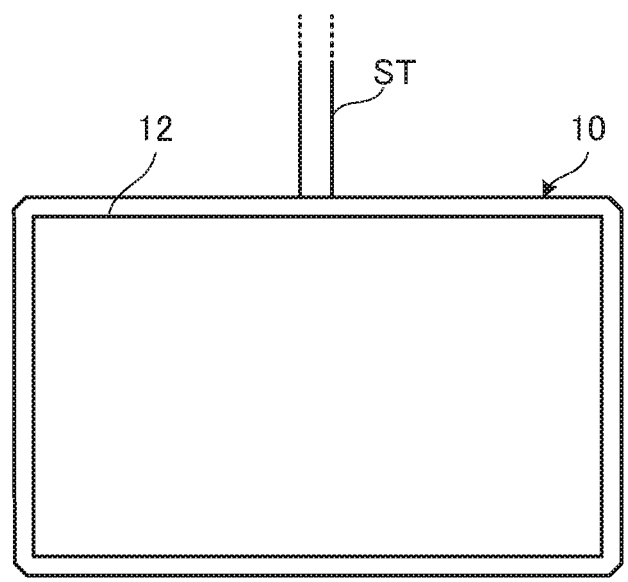
FIG. 1 is a plan view showing an appearance of an information processing apparatus according to an embodiment of the disclosure.
Figure 2:
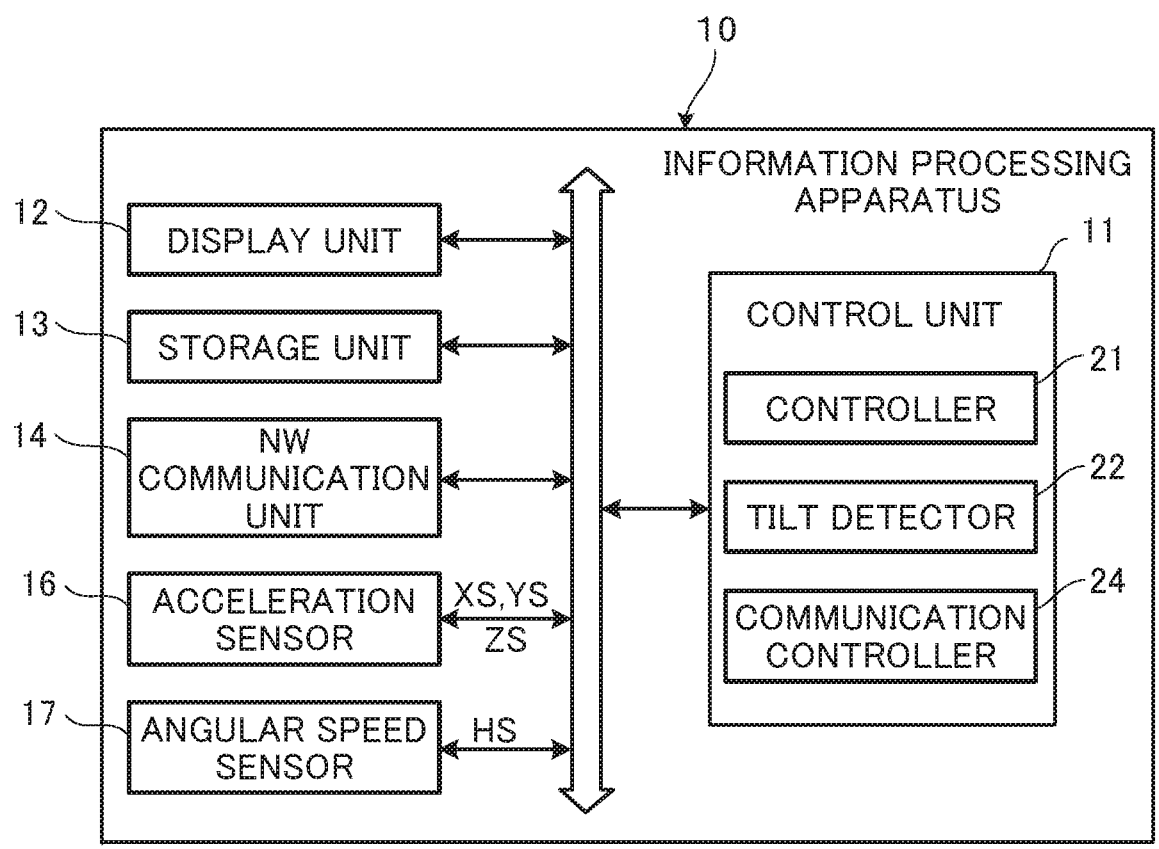
FIG. 2 is a block diagram showing an internal configuration of the information processing apparatus according to the embodiment of the disclosure.

FIG. 1 is a plan view showing an appearance of an information processing apparatus according to the embodiment of the disclosure. FIG. 2 is a block diagram showing an internal configuration of the information processing apparatus according to the embodiment.

The information processing apparatus 10 according to this embodiment is an identification (ID) card, for example a staff ID, and includes a control unit 11, a display unit 12, a storage unit 13, a network (NW) communication unit 14, an acceleration sensor 16, and an angular speed sensor 17. The mentioned elements are configured to transmit and receive data or signals to and from each other, via a bus.

The display unit 12 includes, for example, a liquid crystal display (LCD), an organic light-emitting diode (OLED), or an electronic paper.

The storage unit 13 is, for example, electrically erasable programmable read-only memory (FEPROM) having a large capacity, and stores therein a plurality of contents to be displayed on the display unit 12.

The NW communication unit 14 is a communication interface including a communication module such as a non-illustrated local area network (LAN) chip. The NW communication unit 14 is connected to a server via a network such as a public telephone network, to perform data communication with the server. For example, the content transmitted from the server is received by the NW communication unit 14, and stored in the storage unit 13.

The acceleration sensor 16, which is a known tri-axis acceleration sensor incorporated in the information processing apparatus 10, detects acceleration in three directions, namely along an X-axis, a Y-axis, and a Z-axis of the screen of the display unit 12, and outputs detection signals XS, YS, and ZS respectively indicating the acceleration in the three directions.

The angular speed sensor 17, which is a known angular speed sensor incorporated in the information processing apparatus 10, detects the rotation speed of the screen of the display unit 12 about the Y-axis corresponding to the height direction of the screen, and outputs a detection signal HS indicating the rotation speed.

The control unit 11 includes a processor, a random-access memory (RAM), a read-only memory (ROM), and so forth. The processor is, for example, a central processing unit (CPU), a micro-processing unit (MPU), an application specific integrated circuit (ASIC), or the like. The control unit 11 acts, when the processor executes a control program stored in the ROM or the storage unit 13, as the controller 21, a tilt detector 22, and a communication controller 24. Here, the components of the control unit 11 cited above may each be constituted in the form of a hardware circuit, instead of being performed according to the program.

The controller 21 serves to control the overall operation including, as a primary task, controlling of the displaying operation of the display unit 12. The communication controller 24 controls the communicating operation of the NW communication unit 14.

The tilt detector 22 detects gravity acceleration on the basis of the detection signals XS, YS, and ZS from the acceleration sensor 16, and detects the direction (vertical direction) V of the gravity acceleration. Then the tilt detector 22 detects the relation of the X-axis or Y-axis of the display unit 12, with respect to the vertical direction V.

Figure 3A:
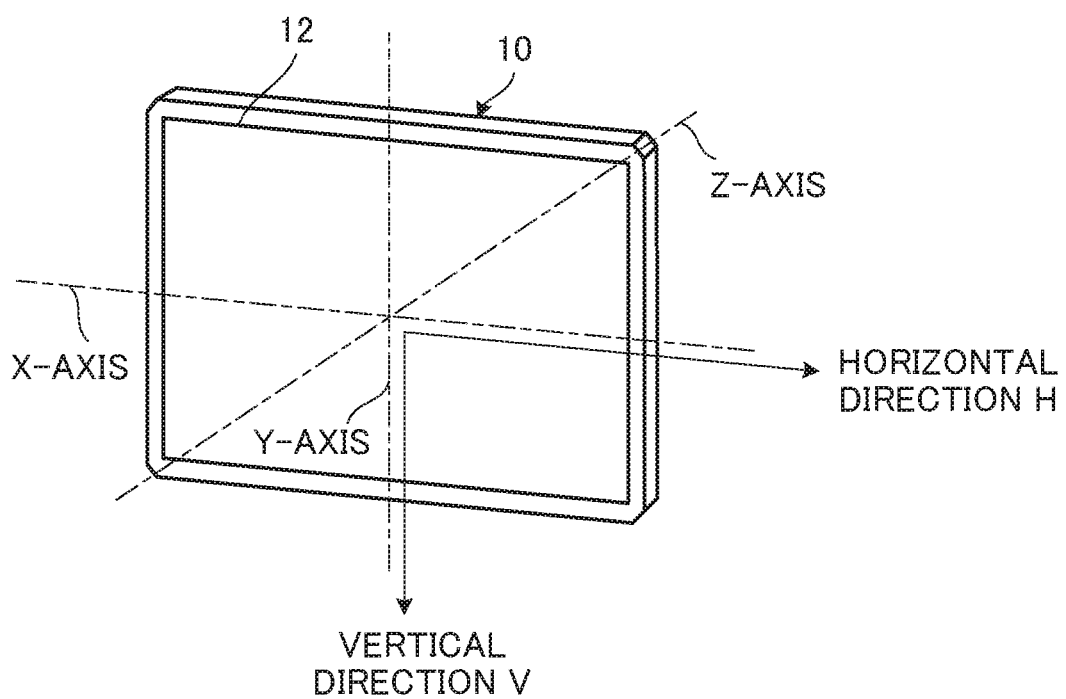
FIG. 3A is a perspective view of the information processing apparatus, with the screen of the display unit generally vertically oriented.

For example, when the user wears the information processing apparatus 10 around his/her neck with a strap ST (see FIG. 1), the screen of the display unit 12 is erected generally vertically, as shown in FIG. 3A. In this case, the vertical direction V is generally parallel to the Y-axis of the screen of the display unit 12, and therefore the tilt detector 22 detects that the direction of the Y-axis of the screen is generally vertical.

Figure 3B:
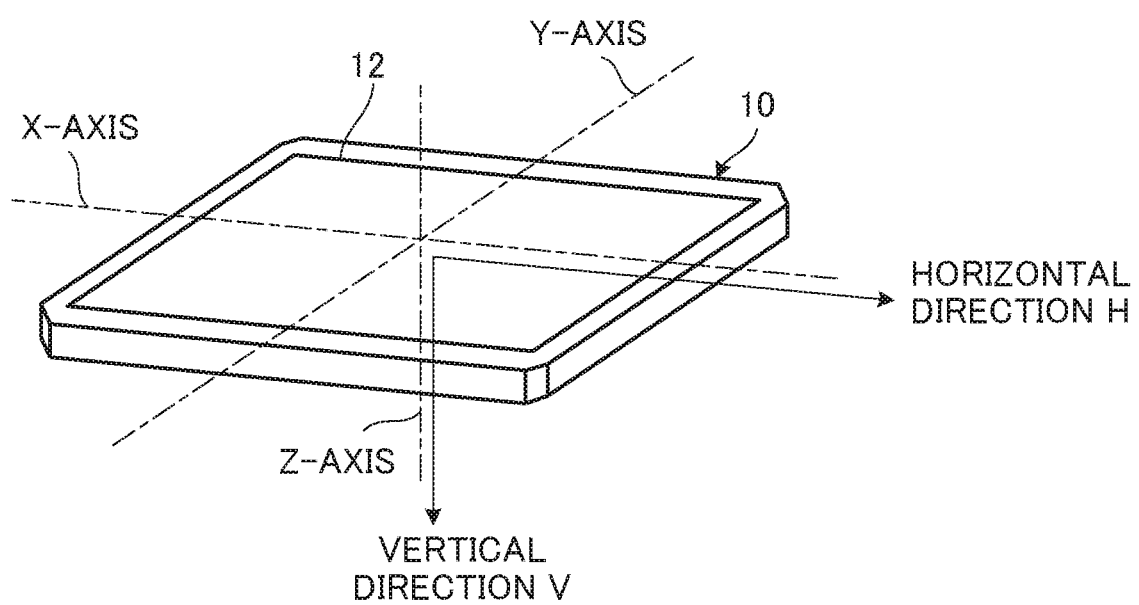
FIG. 3B is a perspective view of the information processing apparatus, with the screen of the display unit generally horizontally oriented.

To view the screen of the display unit 12 of the information processing apparatus 10, the user holds the information processing apparatus 10 with his/her hand and keeps the screen of the display unit 12 generally horizontal, as shown in FIG. 3B. In this case, the vertical direction V is generally orthogonal to the X-axis and the Y-axis of the screen of the display unit 12, and therefore the tilt detector 22 detects a generally horizontal direction H, as the direction of the X-axis and the Y-axis of the screen.

Figure 3C:
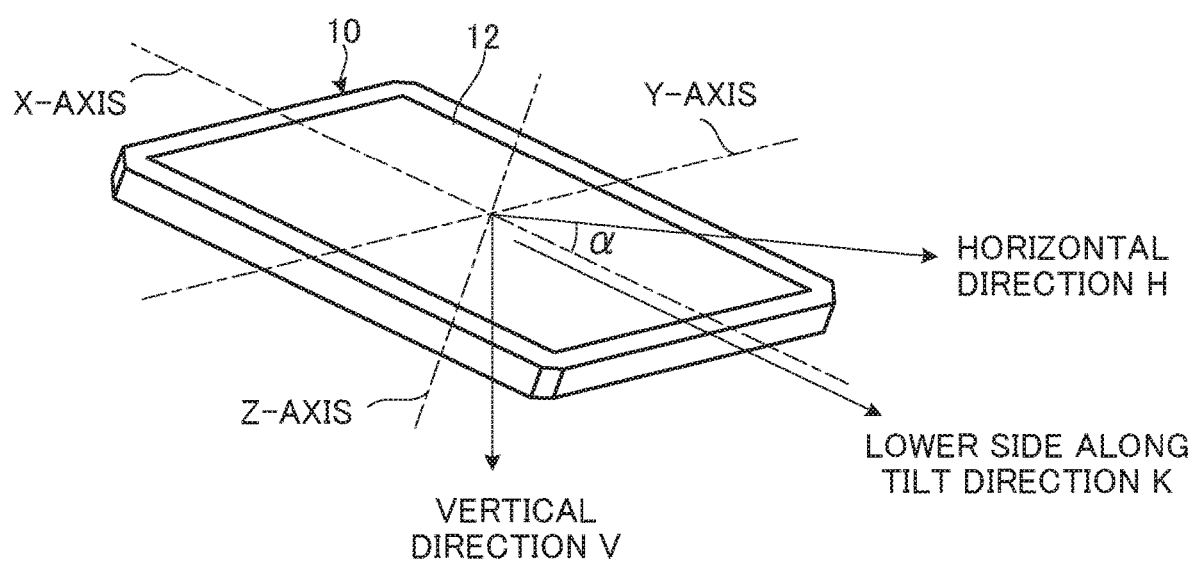
FIG. 3C is a perspective view of the information processing apparatus, with the screen of the display unit tilted from the generally horizontal posture.

Further, when the user tilts the screen of the display unit 12 about the Y-axis thereof as shown in FIG. 3C, the tilt detector 22 detects the generally horizontal direction H as the direction of the Y-axis of the screen of the display unit 12, since the vertical direction V is generally orthogonal to the Y-axis of the screen.

Figure 4:
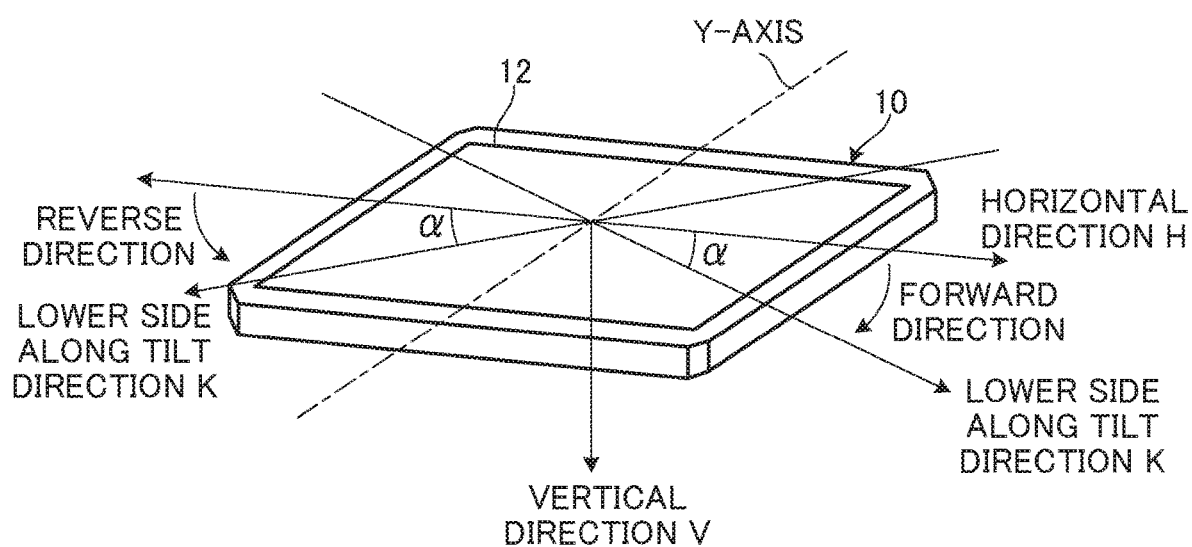
FIG. 4 is a perspective view of the information processing apparatus, for explaining the tilt direction and the tilt angle of the screen of the display unit.

The tilt detector 22 also detects a tilt direction K and a tilt angle α of the screen of the display unit 12 about the Y-axis, with respect to the horizontal direction H as shown in FIG. 3C and FIG. 4, on the basis of the detection signal HS from the angular speed sensor 17. Further, the tilt detector 22 detects the tilt direction K and the tilt angle α of the rotation about the Y-axis, both in a forward direction and in a reverse direction, as shown in FIG. 4.

Here, it is also possible to detect the tilt direction K and the tilt angle α of the screen of the display unit 12, on the basis of the detection signals XS, YS, and ZS from the acceleration sensor 16. Alternatively, a pendulum type or a float switch type tilt sensor may be employed in place of the acceleration sensor 16, to detect the direction of the screen of the display unit 12.

Now, a display order, according to which the plurality of contents stored in the storage unit 13 are to be displayed on the display unit 12, is specified in advance. The display order of each content is cyclically specified, so that transition from the last display order to the first display order, and transition from the first display order to the display order, are both possible.

The controller 21 reads out the content in the first place of the display order from the storage unit 13, and causes the display unit 12 to display the content on the screen. At this point, the user sets the screen of the display unit 12 of the information processing apparatus 10 to the generally horizontal posture as shown in FIG. 3B, to view the screen. Then, in a first case where the user tilts the screen of the display unit 12 in the forward direction about the Y-axis, corresponding to the height direction of the screen, as shown in FIG. 3C, the tilt detector 22 detects the tilt direction K and the tilt angle α of the screen, in the forward direction about the Y-axis.

When the tilt angle α is equal to or larger than a predetermined threshold, the controller 21 causes the display unit 12 to display the content on the screen, such that the content gradually disappears by moving from a higher side to a lower side along the tilt direction K detected by the tilt detector 22. Then the controller 21 reads out a content next in the display order from the storage unit 13, and causes the display unit 12 to display the next content that has been read out, such that the next content gradually appears by moving from the higher side to the lower side along the tilt direction K, in a vacant region (i.e., region where the preceding content is no longer displayed) that appears in a section on the screen expanding as the preceding content disappears as described above.

Likewise, the controller 21 then sequentially reads out the and the tilt direction K are maintained, and causes the display unit 12 to sequentially display each of the contents, such that a new content (in a subsequent place in the predetermined display order) is substituted for a preceding content (in a higher place in the predetermined display order), because of the movement of the contents from the higher side to the lower side in the tilt direction K, on the screen of the display unit 12. Through the mentioned control, the content displayed on the screen of the display unit 12 is substituted with a new content, when the user tilts the screen of the display unit 12 about the Y-axis in the forward direction, as shown in FIG. 3C.

In a second case where the user tilts the screen of the display unit 12 in the reverse direction about the Y-axis, and the tilt angle α is equal to or larger than a predetermined threshold, the tilt detector 22 detects the tilt direction K and the tilt angle α in the reverse direction about the Y-axis of the screen. The controller 21 causes the display unit 12 to sequentially display the contents on the screen, such that a new content (in a subsequent place in the predetermined display order) is substituted for a preceding content (in a higher place in the predetermined display order), because of the movement of the contents from the higher side to the lower side in the tilt direction K, on the screen of the display unit 12. In the second case, the moving direction of the contents realized by the controller 21 is the reverse direction, with respect to the moving direction of the first case.

In addition, when the tilt angle of the screen of the display unit 12 detected by the tilt detector 22 is increased, the controller 21 increases the moving speed of the content on the screen of the display unit 12, to an extent corresponding to the increase in tilt angle.

When the user returns the screen of the display unit 12 of the information processing apparatus 10 to the generally horizontal posture, and resultantly the tilt angle α of the screen about the Y-axis, detected by the tilt detector 22, becomes smaller than the threshold, the controller 21 stops the movement of the content on the screen of the display unit 12. In this case, when only one content is displayed on the screen of the display unit 12, the controller 21 maintains the display of that content. When, for example, two contents are displayed on the screen of the display unit 12, the controller 21 selects one of the contents occupying a larger area on the screen, and keeps moving the contents until only the selected content is displayed on the screen of the display unit 12, at which point the controller 21 stops the movement of the display.

Figure 5A:
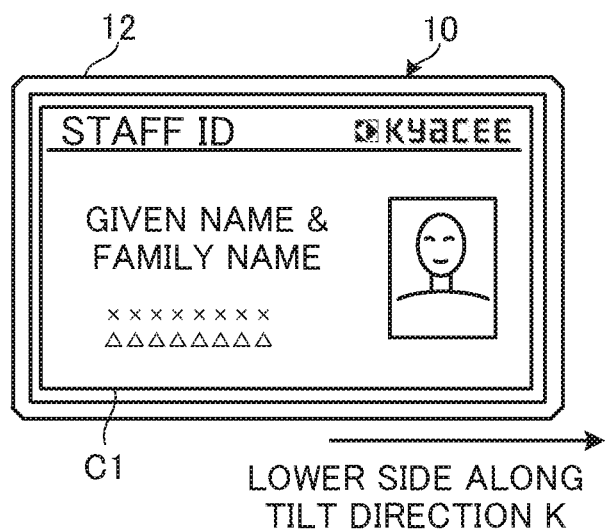
FIG. 5A to FIG. 5E are transitional drawings sequentially showing a switching example of a content on the screen of the display unit.
Figure 5B:
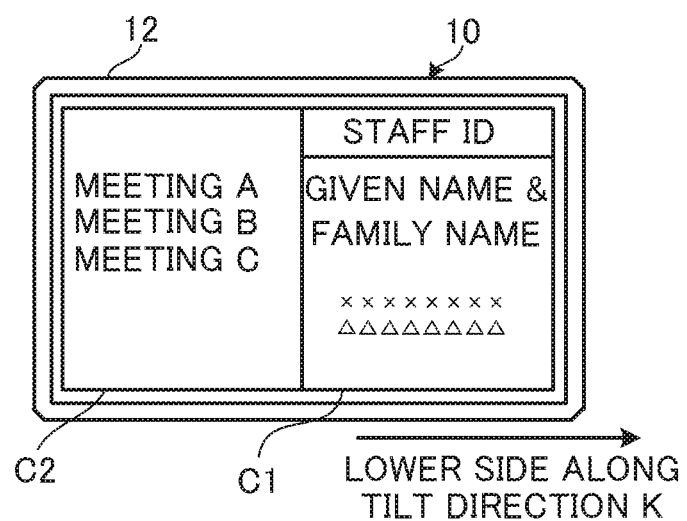
Figure 5C:
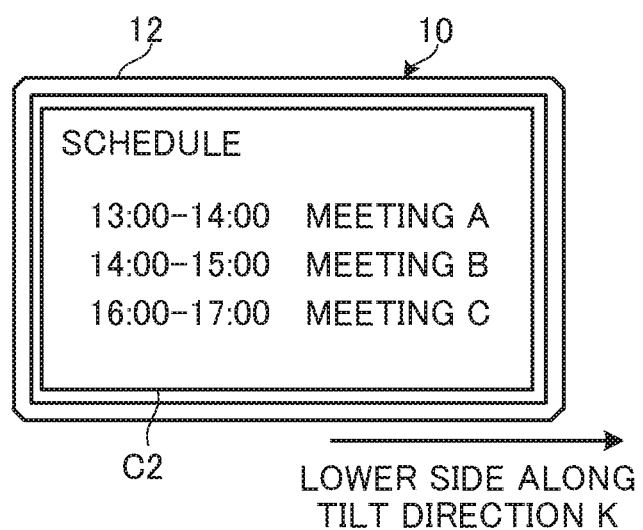

Here, it will be assumed that, for example, a content C1 is displayed on the screen of the display unit 12 as shown in FIG. 5A. In this case, when the screen of the display unit 12 is once set to the generally horizontal posture and then tilted in the forward direction about the Y-axis, the controller 21 moves the content C1 on the screen of the display unit 12, from the higher side to the lower side along the tilt direction K as shown in FIG. 5B, and at the same time displays a next content C2 such that the content C2 moves from the higher side to the lower side along the tilt direction K, until the content C1 disappears from the screen and only the next content C2 is displayed on the screen, as shown in FIG. 5C.

Figure 5D:
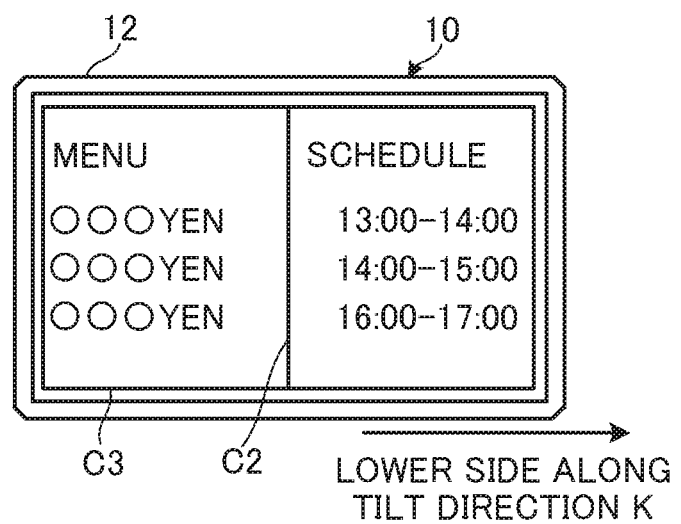
Figure 5E:
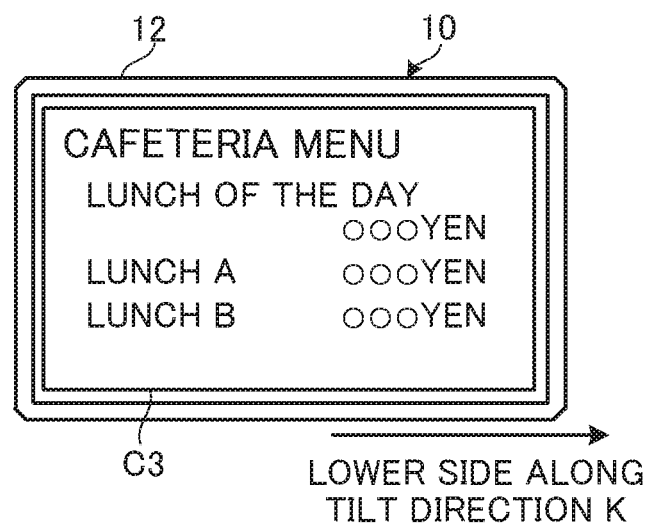
Figure 6A:
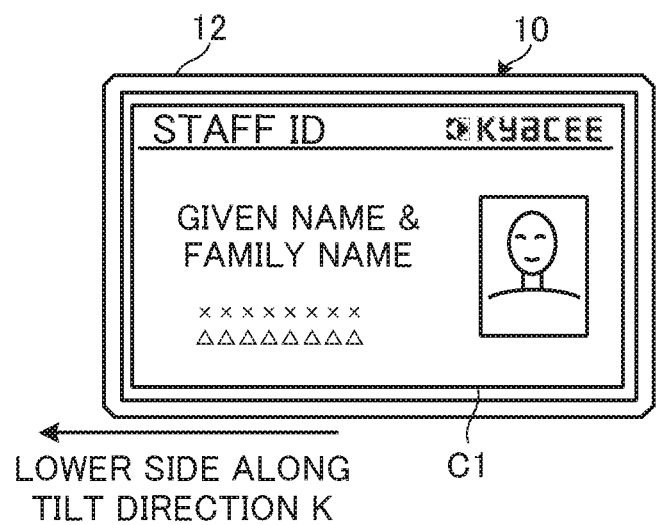
FIG. 6A to FIG. 6E are transitional drawings sequentially showing another switching example of the content on the screen of the display unit.
Figure 6B:
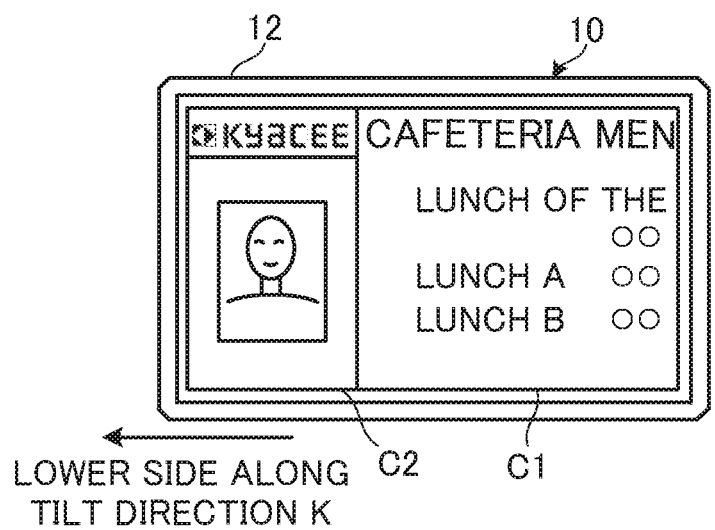
Figure 6C:
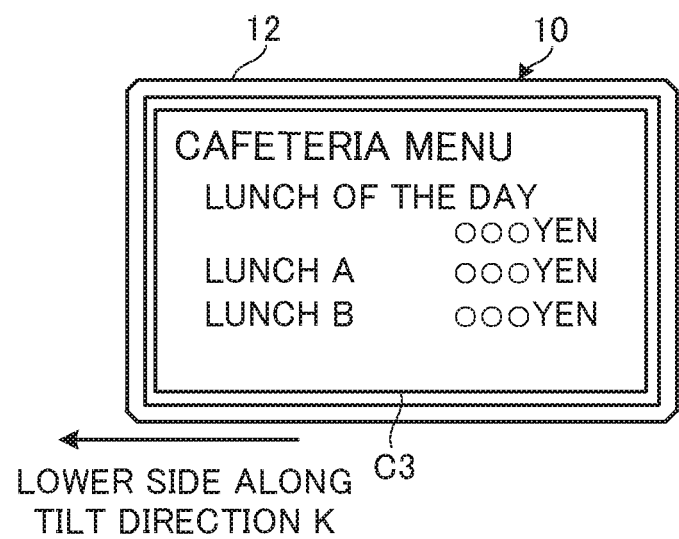
Figure 6D:
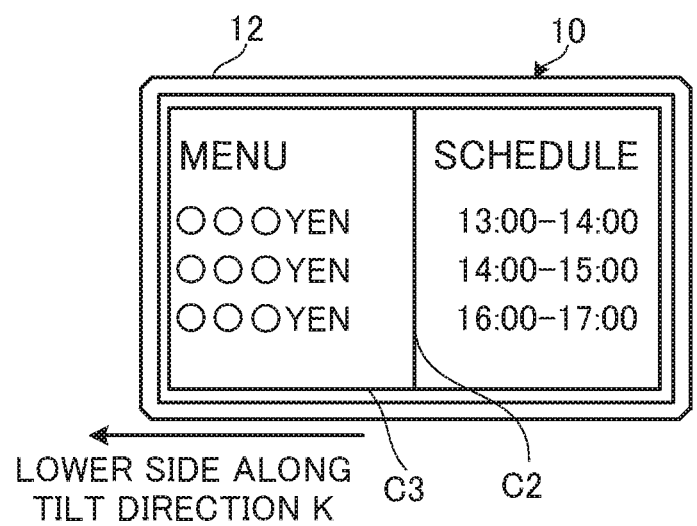
Figure 6E:
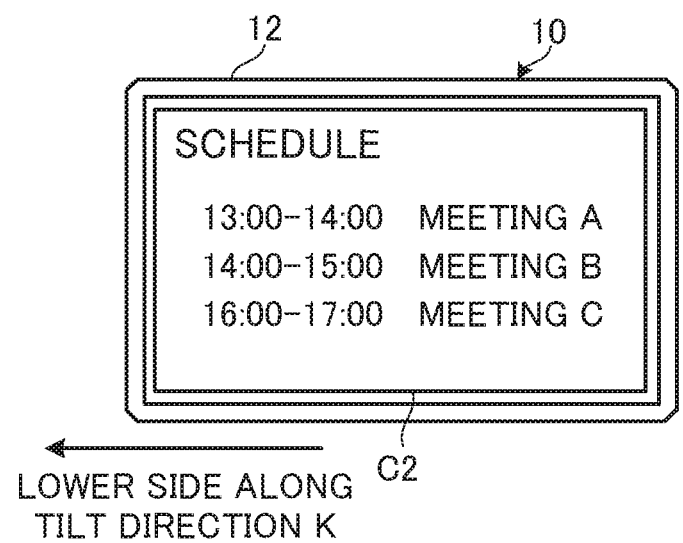

In the case where the screen of the display unit 12 is still tilted, the controller 21 displays the content C2 such that the content C2 moves from the higher side to the lower side along the tilt direction K as shown in FIG. 5D, and at the same time displays the next content C3 such that the content C3 moves from the higher side to the lower side along the tilt direction K thus to be substituted for the content C2, until only the next content C3 is displayed on the screen in place of the content C2, as shown in FIG. 5E.

When the screen of the display unit 12 is tilted in the reverse direction about the Y-axis also, the controller 21 displays the contents such that each content moves from the higher side to the lower side along the tilt direction K. However, the controller 21 displays the contents C1, C2, and C3 in the reverse display order, and such that each content moves in the reverse direction on the screen of the display unit 12, as shown in FIG. 6A to FIG. 6E.

In addition, the moving speed of the contents C1, C2, and C3 on the screen is increased, in proportion to an increase in tilt angle α of the screen of the display unit 12 about the Y-axis.

When the screen of the display unit 12 is returned to the generally horizontal posture, with the content C2 and the next content C3 both displayed on the screen of the display unit 12 as shown in FIG. 5D, the content C3, occupying the larger area on the screen, is selected out of the contents C2 and C3, and only the content C3 is displayed on the screen of the display unit 12, as shown in FIG. 5E.

As mentioned above, the display can be switched among different contents, simply by holding the information processing apparatus 10 and tilting the screen of the display unit 12 or keeping the same in the generally horizontal posture. In addition, even when the contents are moving fast, the contents are gradually switched. Therefore, the user can easily display the desired content, by recognizing the sequential relationship among the contents displayed one after another.

According to this embodiment, further, since the display is switched as each content moves from the higher side to the lower side, when the information processing apparatus 10 is tilted. Therefore, the user can switch the display screen, with a sensation as if the contents displayed on the screen of the display unit 12 were washed away to the lower side, upon tilting the information processing apparatus 10. Consequently, the user can intuitively perceive the method to switch the display of the contents, and easily acquire the display of the next content.

Figure 7A:
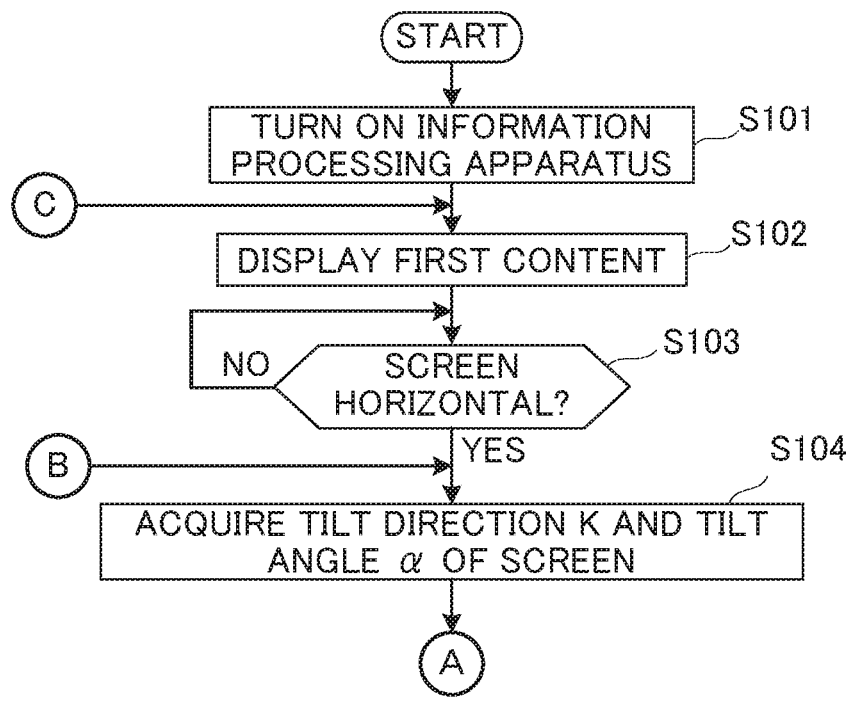
FIG. 7A is a flowchart showing a switching process of the content displayed on the display unit.
Figure 7B:
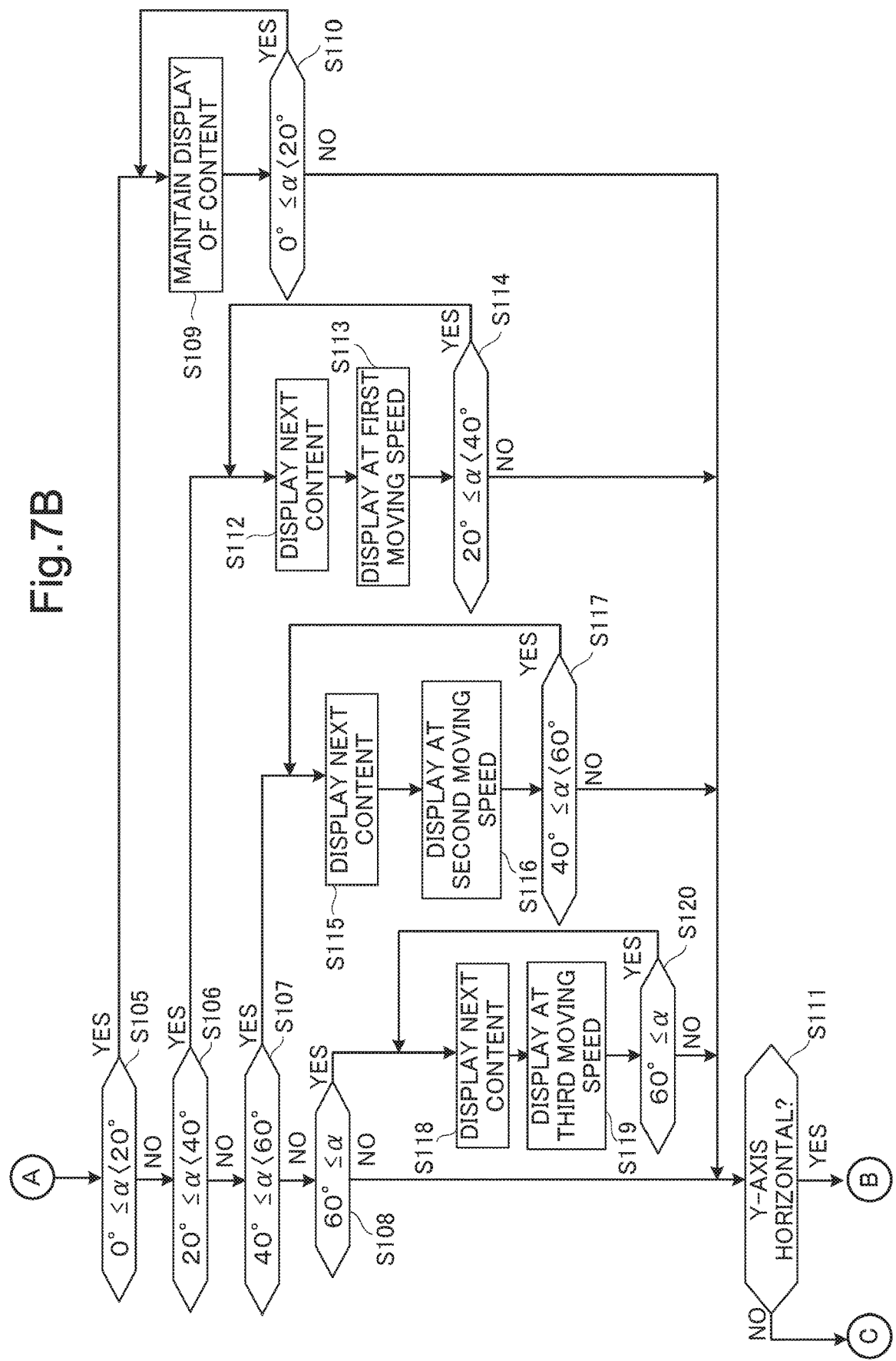
FIG. 7B is a flowchart showing a process that follows FIG. 7A.

Hereunder, the switching process of the contents displayed on the display unit 12, performed by the user by operating the information processing apparatus 10, will be described with reference to the flowchart shown in FIG. 7A and FIG. 7B.

First, the user suspends the information processing apparatus 10 by wearing the strap ST around his/her neck, and activates the information processing apparatus 10 by turning on the power switch (step S101). When the information processing apparatus 10 is activated, the controller 21 reads out the content C1, first in the display order, from the storage unit 13, and causes the display unit 12 to display the content C1 on the screen (step S102).

When the information processing apparatus 10 is suspended as above from the user, the screen of the display unit 12 is erected generally vertically as shown in FIG. 3A, and therefore the tilt detector 22 detects the generally vertical direction, as the direction of the Y-axis of the screen of the display unit 12. Accordingly, the controller 21 decides that the screen of the display unit 12 is not in the horizontal posture (No at step S103), and stands by until the screen of the display unit 12 assumes the generally horizontal posture (maintains the display of the first content C1), repeating the operation of step S103.

Thereafter, when the user holds the information processing apparatus 10 in his/her hand, such that the screen of the display unit 12 assumes the generally horizontal posture, the vertical direction V is generally orthogonal to the X-axis and the Y-axis of the screen of the display unit 12 as shown in FIG. 3B, and therefore the tilt detector 22 detects that the directions of the X-axis and the Y-axis are generally horizontal. In this case, the controller 21 detects that the screen of the display unit 12 is in the generally horizontal posture (Yes at step S103), and acquires the tilt direction K and the tilt angle α of the screen of the display unit 12 about the Y-axis, detected by the tilt detector 22 (step S104). Then the controller 21 decides which of a first angle range A (0°≤α<20°), a second angle range B (20°≤α<40°), a third angle range C (40°≤α<60°), and a fourth angle range D (60°≤α), the tilt angle α falls in (step S105, step S106, step S107, and step S108).

For example, in the case where the user maintains the screen of the display unit 12 in the generally horizontal posture, the controller 21 decides that the tilt angle α about the Y-axis falls in the first angle range A (0°≤α<20°) (Yes at step S105), and keeps the content C1 displayed on the screen of the display unit 12 (step S109). Then, in the case where the controller 21 decides that the tilt angle α about the Y-axis remains in the first angle range A (Yes at step S110), the operation of step S109 is continued. Therefore, as long as the user maintains the screen of the display unit 12 in the generally horizontal posture, the display of the content C1 is maintained on the screen of the display unit 12, and the content on the screen is kept from moving. In this case, the angle of 20 degrees corresponds to the predetermined threshold referred to above.

In the case where the controller 21 decides that the tilt angle α about the Y-axis is not in the first angle range A (No at step S110), the controller 21 repeats the operation as from step S104, when the direction of the Y-axis of the screen of the display unit 12, detected by the tilt detector 22, remains generally horizontal (Yes at step S111). In other words, as long as the direction of the Y-axis of the screen of the display unit 12 is maintained generally horizontal, as shown in FIG.

3B or FIG. 3C, the controller 21 assumes that the user is continuing with the operation for switching the display of the content, and repeats the operation as from step S104.

Then, when the user largely tilts the screen of the display unit 12 about the Y-axis, and the controller 21 decides that the tilt angle α about the Y-axis falls, for example, in the second angle range B (20°≤α<40°) (No at step S105, Yes at step S106), the controller 21 moves the content C1 on the screen of the display unit 12 from the higher side to the lower side along the tilt direction K, thereby gradually erasing the content C1. The controller 21 then reads out the content corresponding to the display order determined by whether the tilt direction K is forward or reverse, from the storage unit 13, and causes the display unit 12 to display the content thus read out, such that the content moves from the higher side to the lower side along the tilt direction K (step S112). In this process, the controller 21 moves each content on the screen of the display unit 12, at a predetermined first moving speed V1 (step S113). When the controller 21 decides that the tilt angle α remains in the second angle range B (Yes at step S114), the controller 21 repeats the operation of step S112 and step S113. Accordingly, while the tilt angle α about the Y-axis remains in the second angle range B, the subsequent contents are sequentially read out from the storage unit 13, and displayed such that each content moves from outside the screen of the display unit 12 toward the lower side along the tilt direction K, at the first moving speed V1.

In the case where the controller 21 decides that the tilt angle α about the Y-axis is not in the second angle range B (20°<α<40° (No at step S114), the controller 21 repeats the operation as from step S104, when the direction of the Y-axis of the screen of the display unit 12, detected by the tilt detector 22, remains generally horizontal (Yes at step S111), in other words when the user is continuing with the operation for switching the display of the content.

When the user returns the screen of the display unit 12 to the generally horizontal posture from the mentioned state, the controller 21 decides that the tilt angle α about the Y-axis falls in the first angle range A (0°≤α<20°) (Yes at step S105). In the case where, at this point, only one content is displayed on the screen of the display unit 12 as result of the operation of step S112 and step S113, the controller 21 continues to display the current content on the screen of the display unit 12 (step S109), thus maintaining the display of the same content.

In contrast, in the case where the user returns the screen of the display unit 12 to the generally horizontal posture, when two contents are displayed on the screen of the display unit 12 as result of the operation of step S112 and step S113, the controller 21 equally decides that the tilt angle α about the Y-axis falls in the first angle range A (Yes at step S105). However, the controller 21 selects the content occupying a larger area on the screen of the display unit 12, out of the two contents displayed, and causes the display unit 12 to display only the selected content on the screen (step S109), maintaining thereafter the display of the selected content.

When the user further tilts the screen of the display unit 12, the controller 21 decides that the tilt angle α about the Y-axis falls in the third angle range C (40°≤α<60°) (No at step S106, Yes at step S107). In this case also, the controller 21 moves the content C1 on the screen of the display unit 12 from the higher side to the lower side along the tilt direction K, thereby gradually erasing the content C1. The controller 21 then reads out the content corresponding to the display order determined by whether the tilt direction K is forward or reverse, from the storage unit 13, and causes the display unit 12 to display the content thus read out, such that the content moves from the higher side to the lower side along the tilt direction K (step S115).

Figure 8A:
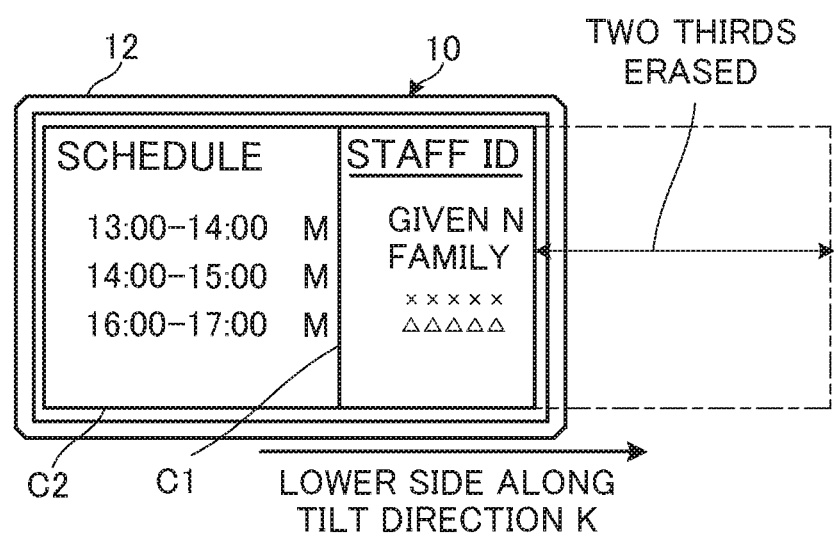

In this process, the controller 21 moves the contents on the screen of the display unit 12 at a predetermined second moving speed V2 (V1<V2). Then the controller 21 increases the moving speed of the content C1 and the content C2 from the second moving speed V2 (e.g., up to twice of V2), for example when a portion of the content C1 corresponding to two thirds of the width thereof has been erased, as shown in FIG. 8A.

When the content C1 is completely erased and the entirety of the content C2 is displayed on the screen as shown in FIG. 8B, the controller 21 returns the moving speed of the content C2 to the second moving speed V2, and also sets the moving speed of the next content C3 to the second moving speed V2 (step S116).

Further, when the controller 21 decides that the tilt angle α remains in the third angle range C (Yes at step S117), the controller 21 repeats the operation of step S115 and step S116. Accordingly, while the tilt angle α about the Y-axis remains in the third angle range C, the subsequent contents are sequentially read out from the storage unit 13, and displayed such that each content moves from outside the screen of the display unit 12 toward the lower side along the tilt direction K, at the second moving speed V2. When a portion of the preceding content corresponding to two thirds of the width thereof has been erased, the controller 21 increases the moving speed of each content from the second moving speed V2, and when the preceding content is completely erased and the entirety of the next content is displayed on the screen, the controller 21 returns the moving speed of the next content to the second moving speed V2. Therefore, the switching from one content to another can be more quickly performed, without compromising the visibility of each content.

In the case where, in contrast, the controller 21 decides that the tilt angle α about the Y-axis is not in the third angle range C (40°≤α<60°) (No at step S117), the controller 21 repeats the operation as from step S104, when the direction of the Y-axis of the screen of the display unit 12, detected by the tilt detector 22, remains generally horizontal (Yes at step S111).

When the user returns the screen of the display unit 12 to the generally horizontal posture from the mentioned state, the controller 21 decides that the tilt angle α about the Y-axis falls in the first angle range A (0°≤α<20°) (Yes at step S105). Upon making such decision, the controller 21 either (i) maintains the display of the current content on the screen of the display unit 12 (step S109), when only one content is displayed on the screen of the display unit 12, or (ii) selects the content occupying a larger area out of the contents displayed, and causes the display unit 12 to display only the selected content on the screen (step S109), maintaining thereafter the display of the selected content, when a plurality of contents are displayed on the screen.

When the user tilts the screen of the display unit 12 by a larger angle, from the state where the tilt angle α is in the first angle range A, the controller 21 decides that the tilt angle α about the Y-axis falls in the fourth angle range D (60°≤α) (Yes at step S108). In this case also, the controller 21 moves the content C1 on the screen of the display unit 12 from the higher side to the lower side along the tilt direction K, thereby gradually erasing the content C1. The controller 21 then reads out the content corresponding to the display order determined by whether the tilt direction K is forward or reverse, from the storage unit 13, and causes the display unit 12 to display the content thus read out, such that the content moves from the higher side to the lower side along the tilt direction K (step S118).

Figure 9A:
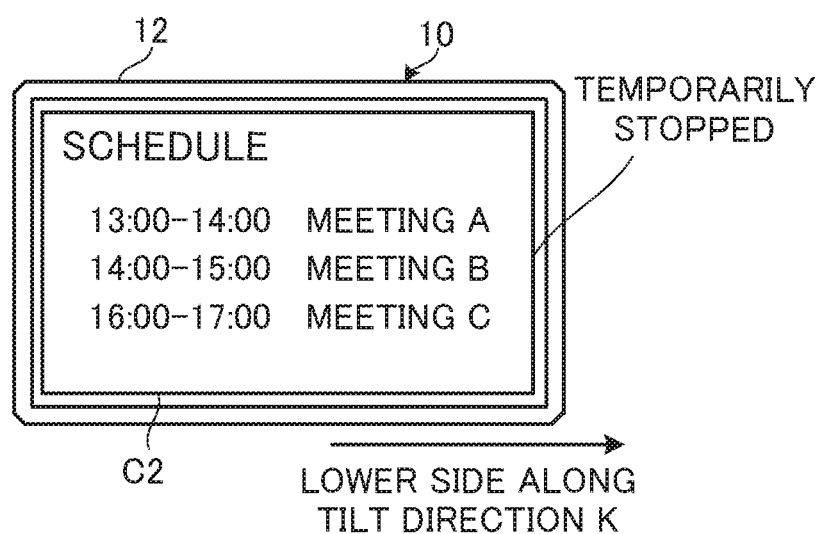
FIG. 9A and FIG. 9B are schematic drawings showing another display switching method of the content, on the screen of the display unit.
Figure 9B:
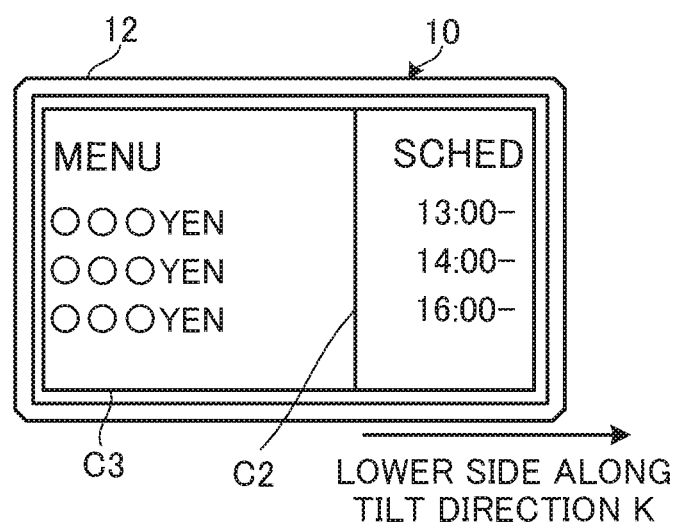

In this process, the controller 21 moves the contents on the screen of the display unit 12 at a predetermined third moving speed V2 (V1<V2<V3) (step S119). Then the controller 21 temporarily stops the movement of the content C2, for example at the time point that the content C2 has come to be exclusively displayed on the screen as shown in FIG. 9A. Immediately thereafter, the controller 21 moves the content C2 from the higher side to the lower side along the tilt direction K at the third moving speed V3, thereby gradually erasing the content C2, and starts to display the next content C3 such that the content C3 moves from the higher side to the lower side along the tilt direction K, as shown in FIG. 9B.

When the controller 21 decides that the tilt angle α remains in the fourth angle range D (Yes at step S120), the controller 21 repeats the operation of step S118 and step S119. Accordingly, while the tilt angle α about the Y-axis remains in the fourth angle range D, the subsequent contents are sequentially read out from the storage unit 13, and displayed such that each content moves on the screen of the display unit 12 from the higher side to the lower side along the tilt direction K, at the third moving speed V3. Then when the content has come to be exclusively displayed on the screen, the controller 21 temporarily stops the movement of the content. Immediately thereafter, the controller 21 moves the content to the lower side along the tilt direction K at the third moving speed V3, thereby gradually erasing the content, and starts to display the next content such that the content moves from the higher side to the lower side along the tilt direction K. Therefore, the user can surely recognize the state where only the desired content is displayed, despite each content moving at a high speed on the screen of the display unit 12.

In the case where, in contrast, the controller 21 decides that the tilt angle α about the Y-axis is not in the fourth angle range D (60°≤α) (No at step S120), the controller 21 repeats the operation as from step S104, when the direction of the Y-axis of the screen of the display unit 12, detected by the tilt detector 22, remains generally horizontal (Yes at step S111).

When the screen of the display unit 12 is returned to the generally horizontal posture, the controller 21 decides that the tilt angle α about the Y-axis falls in the first angle range A (0°≤α<20°) (Yes at step S105). Accordingly, upon making such decision, the controller 21 either (i) maintains the display of the current content on the screen of the display unit 12 (step S109), when only one content is displayed on the screen of the display unit 12, or (ii) selects the content occupying a larger area out of the contents displayed, and causes the display unit 12 to display only the selected content on the screen (step S109), maintaining thereafter the display of the selected content, when a plurality of contents are displayed on the screen.

Further, when the controller 21 decides that the tilt angle α about the Y-axis is deviated from the first angle range A, the second angle range B, the third angle range C, or the fourth angle range D (No at step S110, step S114, step S117, and step S120), for example because the user has released the information processing apparatus 10 to the suspended state, with the strap ST worn around his/her neck, thereby making the Y-axis of the screen of the display unit 12 parallel to the vertical direction V the controller 21 decides that the direction of the Y-axis of the screen of the display unit 12 is not maintained generally horizontal (No at step S111), and assumes that the user has finished the operation for switching the display of the content. Therefore, the operation returns to step S102.

Here, when the display of a page is switched according to the tilt direction, in an existing display system, the next page is displayed after the preceding page is erased. Accordingly, when the pages are switched rapidly, it is difficult to recognize the sequential relationship among the pages being switched one after another, and therefore it is difficult to identify the desired page and stop the display when that page has appeared.

With the information processing apparatus 10 according to this embodiment, in contrast, the display of different contents can be switched, simply by maintaining the screen of the display unit 12 in the generally horizontal posture, or tilting the same, without the need to provide keys or a touch panel. In addition, even when the contents are moving fast, the user can easily recognize the sequential relationship among the contents displayed one after another, to thereby easily identify the desired content and obtain the display thereof.

According to the foregoing embodiment, the controller 21 temporarily stops the movement of the content C2, at the time point that the content C2 has come to be exclusively displayed on the screen as shown in FIG. 9A. Immediately thereafter, the controller 21 moves the content C2 to the lower side along the tilt direction K at the third moving speed V3, thereby gradually erasing the content C2, and starts to display the next content C3 such that the content C3 moves from the higher side to the lower side along the tilt direction K, as shown in FIG. 9B. However, the following arrangement may be adopted.

Figure 10A:
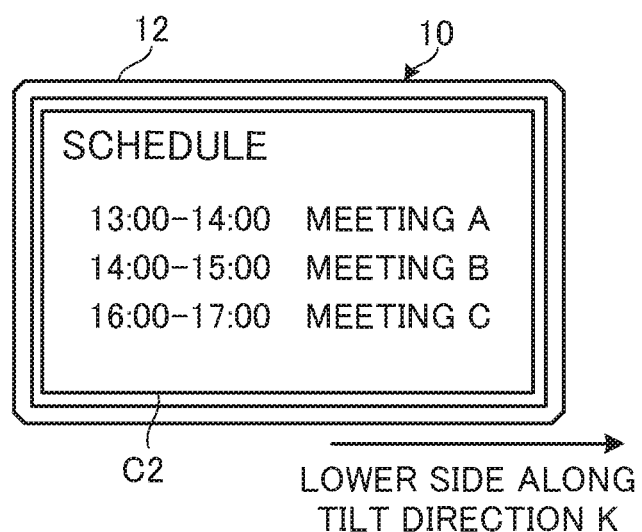
FIG. 10A to FIG. 10C are schematic drawings showing still another display switching method of the content, on the screen of the display unit.
Figure 10B:
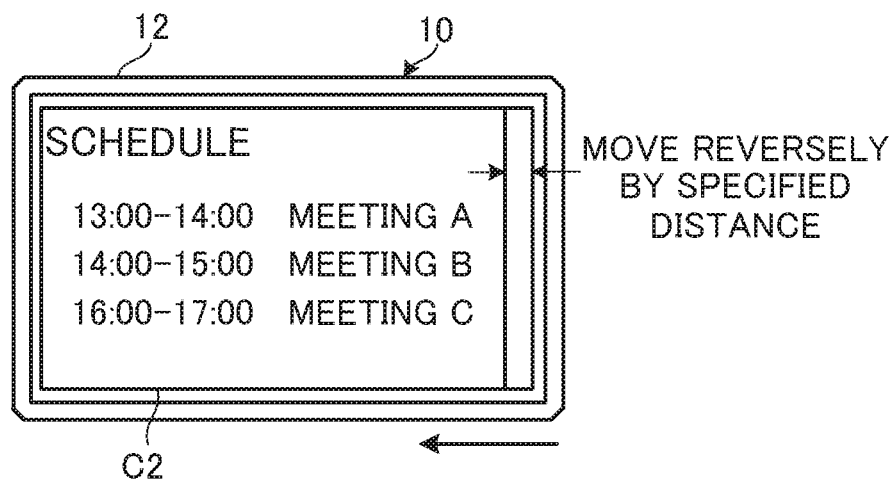
Figure 10C:
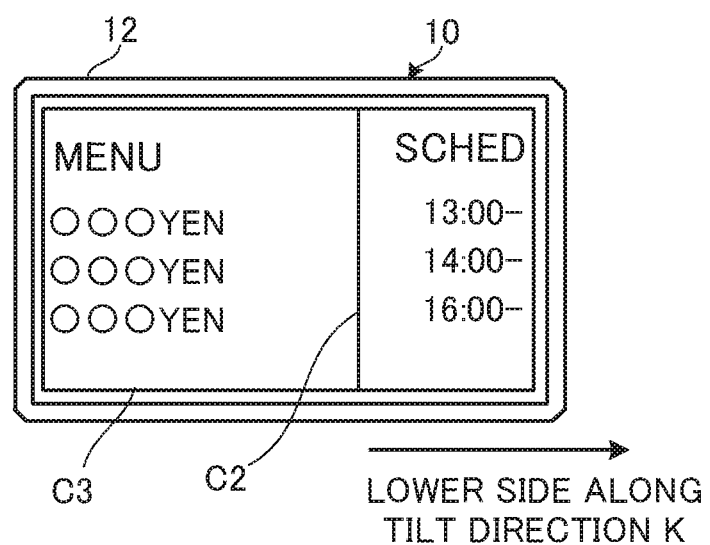

After temporarily stopping the movement of the content C2 at the time point that the content C2 has come to be exclusively displayed on the screen as shown in FIG. 10A, the controller 21 may move the content C2 in the reverse direction (from the lower side to the higher side along the tilt direction K) by a predetermined distance, as shown in FIG. 10B, and then display the content C2 such that the content C2 moves from the higher side to the lower side along the tilt direction K, as shown in FIG. 10C. In this case also, the user can surely recognize the state where only the desired content is displayed, despite each content moving at a high speed on the screen of the display unit 12.

Although the tilt detector 22 is configured to detect the tilt direction K and the tilt angle α of the screen of the display unit 12 about the Y-axis, with respect to the horizontal direction in the foregoing embodiment, a tilt direction K and a tilt angle α of the screen about the Y-axis with respect to a predetermined direction other than the horizontal direction may be detected, and the controller 21 may perform the display control on the basis of the detection result. For example, the tilt detector 22 may detect the direction of the X-axis of the screen of the display unit 12 with respect to the vertical direction V, for example in response to an operation of keys, when the screen of the display unit 12 is maintained in a given posture, and the detected direction of the X-axis may be employed as an initial value representing a predetermined direction, so that the tilt detector 22 may detect the tilt direction K and the tilt angle α of the screen about the Y-axis, with respect to the predetermined direction.

Further, the information processing apparatus according to the disclosure is applicable to different types of portable devices, without limitation to the IC card.

The configurations according to the foregoing embodiment, described with reference to FIG. 1 to FIG. 10, are merely exemplary, and in no way intended to limit the disclosure to those configurations.

While the present disclosure has been described in detail with reference to the embodiments thereof, it would be apparent to those skilled in the art the various changes and modifications may be made therein within the scope defined by the appended claims.

What is claimed is:

1. An information processing apparatus comprising:
a display unit;
a storage unit that stores a plurality of contents to be sequentially displayed on a screen of the display unit; and
a control unit including a processor, and configured to act, when the processor executes a control program, as a tilt detector that detects a tilt direction of the screen when the screen is tilted, and a controller that reads out a content from the storage unit and causes the display unit to display the content on the screen,
wherein, when the tilt detector detects, as the tilt direction of the screen, a first tilt direction, the controller (i) causes the display unit to display a preceding content on the screen, such that the content gradually disappears by moving from a higher side to a lower side along the first tilt direction, and (ii) reads out a next content in a display order from the storage unit, and causes the display unit to display the next content that has been read out, such that the next content gradually appears by moving from the higher side to the lower side along the first tilt direction, over a vacant region in the screen where the preceding content is no longer displayed, and expanding as the preceding content disappears, and
while the tilt detector continues to detect the first tilt direction, the controller sequentially reads out the next content from the storage unit, causes the display unit to display the next content such that the next content moves from the higher side to the lower side along the first tilt direction, temporarily stops the movement of the next content from the higher side to the lower side at a time point that the next content has come to be exclusively displayed on the screen, causes the display unit to display the next content such that the next content moves from the lower side to the higher side along the first tilt direction by a predetermined distance, and causes the display unit to display the next content such that the next content further moves from the higher side to the lower side along the first tilt direction.

2. The information processing apparatus according to claim 1,
wherein the tilt detector detects a tilt angle of the screen, and
the controller increases a moving speed of the content on the screen, when the tilt angle of the screen detected by the tilt detector is increased, by an amount corresponding to the increase in tilt angle of the screen detected by the tilt detector.

3. The information processing apparatus according to claim 1,
wherein, while the tilt detector continues to detect the first tilt direction, the controller sequentially reads out the next content from the storage unit, increases a moving speed of each content displayed on the screen by a predetermined amount, when a portion of the preceding content corresponding to a predetermined ratio of a width of the preceding content has been erased, and returns the moving speed to the original speed, at a time point that the next content has come to be exclusively displayed on the screen.

4. The information processing apparatus according to claim 2,
wherein, when the tilt angle of the screen detected by the tilt detector is reduced to a predetermined angle, the controller stops the movement of the content when only one content is displayed on the screen, and causes the display unit, when a plurality of contents are displayed on the screen, to display only the content occupying a larger area on the screen.

5. The information processing apparatus according to claim 1, further comprising a tri-axis acceleration sensor,
wherein the tilt detector detects the tilt direction of the screen, on a basis of a detection signal outputted from the acceleration sensor.

6. The information processing apparatus according to claim 1, further comprising an angular speed sensor,
wherein the tilt detector detects the tilt direction of the screen, on a basis of a detection signal outputted from the angular speed sensor.

7. The information processing apparatus according to claim 2,
wherein, while the tilt detector continues to detect the first tilt direction, the controller sequentially reads out the next content from the storage unit, causes the display unit to display the next content such that the next content moves from the higher side to the lower side along the first tilt direction,
when the tilt angle of the screen detected by the tilt detector falls in a predetermined first range, temporarily stops the movement of the next content from the higher side to the lower side at a time point that the next content has come to be exclusively displayed on the screen, and then causes the display unit to display the next content such that the next content further moves from the higher side to the lower side along the first tilt direction, and
when the tilt angle of the screen detected by the tilt detector falls in a predetermined second range different from the first range, temporarily stops the movement of the next content from the higher side to the lower side at a time point that the next content has come to be exclusively displayed on the screen, causes the display unit to display the next content such that the next content moves from the lower side to the higher side along the first tilt direction by the predetermined distance, and causes the display unit to display the next content such that the next content further moves from the higher side to the lower side along the first tilt direction.

* * * * *